United States Patent
Mittal

(10) Patent No.: US 6,192,464 B1
(45) Date of Patent: *Feb. 20, 2001

(54) METHOD AND APPARATUS FOR DECODING ONE OR MORE INSTRUCTIONS AFTER RENAMING DESTINATION REGISTERS

(75) Inventor: Millind Mittal, Palo Alto, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/001,255

(22) Filed: Dec. 31, 1997

(51) Int. Cl.$^7$ .................................. G06F 9/38; G06F 9/00
(52) U.S. Cl. .................... 712/200; 712/229; 712/244; 712/245
(58) Field of Search .................... 712/216, 217, 712/23, 214, 213, 200, 229, 244, 245; 708/628

(56) References Cited

U.S. PATENT DOCUMENTS

| | | | |
|---|---|---|---|
| 5,627,985 | * 5/1997 | Fetterman et al. ............... | 712/217 |
| 5,701,508 | * 12/1997 | Glew et al. ............... | 395/800 |
| 5,721,855 | * 2/1998 | Hinton et al. ............... | 395/394 |
| 5,748,934 | * 5/1998 | Lesartre et al. ............... | 712/216 |
| 5,835,747 | * 11/1998 | Trull ............... | 712/216 |
| 5,835,748 | * 11/1998 | Orenstein et al. ............... | 395/393 |
| 5,850,533 | * 12/1998 | Panwar et al. ............... | 712/216 |
| 5,852,726 | * 12/1998 | Lin et al. ............... | 395/376 |
| 5,870,579 | * 2/1999 | Tan ............... | 712/317 |
| 5,898,853 | * 4/1999 | Panwar et al. ............... | 712/216 |
| 5,918,031 | 6/1999 | Morrison et al. . | |
| 5,951,670 | * 9/1999 | Glew et al. ............... | 712/23 |
| 5,974,531 | * 10/1999 | Shang et al. ............... | 712/202 |
| 5,996,068 | * 11/1999 | Dwyer, III et al. ............... | 712/228 |
| 6,016,540 | * 1/2000 | Zaidi et al. ............... | 712/214 |

\* cited by examiner

Primary Examiner—Rita Elmore
(74) Attorney, Agent, or Firm—Blakely, Sokoloff, Taylor & Zafman LLP

(57) ABSTRACT

In one aspect the present invention provides for a method for executing a sequence of instructions in a processor. The method comprises decoding a first the instructions into one or more first micro-ops, renaming destination registers identified in a first portion of the first micro-ops by reassigning available additional physical registers for the destination registers, and decoding a second portion of the first micro-ops into one or more second micro-ops. The act of renaming has renamed a destination register of at least one micro-op of the second portion of the first micro-ops. The method executes a third portion of the first and the second micro-ops.

36 Claims, 8 Drawing Sheets

Instruction Sequence $R_1$ = micro-op$_1${A, B};    first micro-op    42
$R_1$ = micro-op$_2${C, D};  second micro-op  44
E = micro-op$_3${$R_1$, A};  third micro-op    46
40

Out-Of-Order Execution Sequence $R_1$ = micro-op$_2${C, D};  second micro-op  44
$R_1$ = micro-op$_1${A, B};    first micro-op    42
E = micro-op$_3${$R_1$, A};  third micro-op    46
50

Renamed Instruction Sequence $R_1$ = micro-op$_1${A, B};  first micro-op    42
$R'_1$ = micro-op$_2${C, D};  second micro-op  45
E = micro-op$_3${$R'_1$, A};  third micro-op    47
52

FIGURE 2A
(prior art)

Instruction Sequence

A = micro-op$_1${R$_1$, B};   first micro-op   64
R$_1$ = micro-op$_2${C, D};  second micro-op  62

60

Out-Of-Order Execution Sequence

R$_1$ = micro-op$_2${C, D};  second micro-op  62
A = micro-op$_1${R$_1$, B};   first micro-op   64

66

Renamed Instruction Sequence

A = micro-op$_1${R$_1$, B};   first micro-op   64
R'$_1$ = micro-op$_2${C, D};  second micro-op  63

METHOD AND APPARATUS FOR DECODING ONE OR MORE INSTRUCTIONS AFTER RENAMING DESTINATION REGISTERS

BACKGROUND OF THE INVENTION

1. Field of the Invention

This invention relates generally to processors and computers, and more particularly, to a method and apparatus that partially decodes instructions into micro-ops before renaming destination registers.

2. Description of the Related Art

Modem processors and computers have increased their operating speeds and efficiency through a variety of methods and structures. Many processors and similar hardware structures increase instruction throughput by executing instructions either in parallel or out-of-order of the original instruction sequence. The instruction throughput of an out-of-order processor may be improved by using auxiliary hardware structures and special methods that make the execution order more flexible. The hardware structures and special methods include fetchers that employ branch prediction, parallel decoders, large reorder buffers, dependency determination, and renaming of destination registers. These hardware structures and methods for treating the incoming instruction sequence may affect the processor's throughput by synergistic interactions.

FIG. 1 illustrates a portion 10 of an out-of-order processor. A fetcher 12 retrieves a sequence of instructions from memory or caches 14. The fetcher 12 sends the retrieved instructions to one or more decoders 16. The decoders 16 translate the complex instructions, e.g., macro instructions, into simpler hardware executable micro-operations (micro-ops). The decoders 16 send a sequence of micro-ops to a renamer 18. The renamer 18 reassigns additional physical registers to replace destination registers of the micro-ops, i.e. the registers for storing results. The renamer 18 may also record data on the dependencies between the micro-ops and on the reassignment of additional physical registers in a dependency table 20. The renamer 18 assigns the renamed micro-ops entries in a reorder buffer 22 and sends the micro-ops to a scheduler 24. The scheduler 24 assigns instructions for execution in an order that may not follow the original order of the instruction sequence. The scheduler 24 does not assign dependent instructions for execution before the instructions on which they depend. The scheduler 24 consults and updates the dependency and register assignment information in the dependency table 20. A retirement unit 28 removes executed instructions from the reorder buffer 28 in the original instruction order and sends the results to registers and/or caches 30.

FIG. 2A illustrates the effect of renaming on the out-of-order execution of write-after-write instructions, i.e. two instructions having the same destination register. At block 40, three instructions 42, 44, 46 are shown in the original order of an instruction sequence. The instructions 42, 44, 46 have been decoded, i.e. they are micro-ops.

The source and destination addresses can include both memory locations and registers. While macro instructions may have a variable number of addresses, decoded instructions, i.e. micro-ops, have a limited and fixed number of destination and source addresses for a given micro-architecture. In most computers, micro-ops do not have more than two source addresses, e.g., A and B for the first instruction 42, and one destination address, e.g., the register $R_1$ for the first and second instructions 42, 44. Some computers may employ micro-ops with more source or destination addresses, but the micro-ops of each architecture still have a limited number of addresses.

Due to the small register sets in many computers, the same register may appear in two or more instructions. For example, the register $R_1$ is the destination address of the first and second instructions 42, 44 of block 40 and is one source address of the third instruction 46. The appearance of the same register in separate instructions can create real and artificial dependencies that prohibit the out-of-order execution of the instructions involved and of instructions dependent thereon.

In the processor 10, it is ordinarily advantageous to be able to execute instructions in any order that keeps the execution unit or units 26 continually busy. For example, executing the second instruction 44 before the first instruction 42 may enable the processor 10 to avoid a period in which one of the execution units 26 is inactive. Instruction dependencies can make the results artificially dependent on the execution order and can interfere with the use of out-of-order execution as a means of improving the efficiency of the processor 10.

Block 50 illustrates the result of executing the second instruction 44 out-of-order, i.e. before the first instruction 42. Since the first and second instructions 42, 44 do not depend on each other, they may be executed in any order. Nevertheless, a problem occurs when the execution order of these write-after-write instructions 42, 44 is inverted, because the third instruction 46 depends on the second instruction 44 in block 40, and the third instruction 46 depends on the first instruction 42 in the inverted order of block 50. Executing write-after-write instructions out-of-order may change the results from subsequent dependent instructions.

Block 52 illustrates how renaming eliminates dependencies when write-after-write instructions are executed out-of-order. The renamer 18 assigns a new additional physical register $R'_1$ for the destination register of the second instruction 44 in block 40, i.e. the register $R_1$ is renamed to $R'_1$, in the instruction 45 of block 52. The renamer 18 also replaces $R_1$ with $R'_1$, in instructions dependent on the second instruction 44, i.e. the source register $R_1$ of the third instruction 46 of block 40 is renamed to $R'_1$, giving the third instruction 47 of block 52. Renaming uses additional physical registers of the processor 10, such as $R'_1$, to "rename", i.e. replace, registers appearing as source or destination addresses in instructions. After renaming, the destination register of the first instruction 42 of block 52 is not an address of the third instruction 47 of block 52. Therefore, the execution of the first instruction 42 and the renamed second instruction 45 may be performed in any order without changing the results coming from dependent instructions, such as the third instruction 47 of block 52.

As illustrated in FIG. 2B, renaming may also be employed to enable the out-of-order execution of write-after-read instructions, i.e. two instructions wherein the same register is a source address for the earlier instruction and a destination address for the later instruction. At block 60, an instruction 62 having a destination register $R_1$ is independent of an earlier instruction 64 having the same register $R_1$ as a source address. Block 66 illustrates the result of executing the first and second instructions 64, 62 of block 60 out-of-order. Now, the destination register $R_1$ of the earlier executed instruction 62 becomes a source address for the later executed instruction 64. The out-of-order execution of the write-after-read instructions 64, 62 generates a new dependency for the instruction 64. Generally, the new dependency for the instruction 64 means that different results are obtained when the two instructions 62, 64 are executed in the original instruction order of block 60 and in the inverted order of block 66.

At block 68, the original destination register $R_1$ of the second instruction 62 of the write-after-read sequence of block 60 has been renamed with an additional physical register $R'_1$. The renamer 18 also renames the source address $R_1$ to $R'_1$ in all subsequent instructions that depend on the original second instruction 62 of block 60. The renamer performs a look-up in the dependency table 20 for correspondences between the original destination register and the additional physical registers so that source registers of dependent instructions are renamed consistently with the previously renamed destination register. After renaming, the scheduler 24 may set the first and second instructions 64, 63, of block 68, for execution in the original order or out of the original order without changing the results.

In the prior art, the decoders 16 produce a sequence of micro-ops from the sequence of instructions received from the fetcher 14. The renamer 18 "blindly" renames the temporary destination registers of each micro-op from the decoders 16 by replacing each temporary destination register with one of the additional physical registers of the processor 10. As long as additional physical registers are available, the renamer 18 continues to assign different physical registers for the temporary destination registers.

The blind decoding and renaming of instructions has, however, several shortcomings. First, the renamer 18 is a multi-ported structure and the renaming process involves look-ups in the dependency table 20 that may slow the instruction throughput of the processor 10. Second, the renamer 18 utilizes long and wide interconnecting wires. Devices using long and wide wires may be constrained to operate at slower speeds due to substantial capacitances associated with such structures. Third, blind renaming uses up more additional physical registers and leaves less additional physical registers available for renaming later instructions. Fourth, though the speed of a processor using blind decoding and renaming may be increased by adding parallel structures or more ports to renamers 18, renamers with parallel structures or more ports occupy more precious area of chip surface. Finally, renaming is not always helpful in facilitating out-of-order execution, because some dependencies are real. Blind renamer structures of the prior art may be inefficient, use more space on the chip surface, operate more slowly due to substantial internal capacitances, need more additional physical registers, and may not facilitate flexible execution of all instructions.

FIG. 3 illustrates a situation 70 in which renaming a destination register does not facilitate out-of-order execution. At block 71, a macro instruction 72 is decoded into micro-ops 73, 74. The first micro-op 73 has a destination register T which is also a source address for the second micro-op 74. Furthermore, later dependent instructions of the instruction sequence (not shown) do not have T as a source register, because the register T only appeared from decoding the original macro instruction 72 into the two micro-ops 73, 74. The two micro-ops 73, 74 both create and eat up the temporary register T. Furthermore, the second micro-op 74 is dependent on the first micro-op 73. Therefore, the second micro-op 74 cannot be assigned for execution before the first micro-op 73. If the renamer 18 blindly replaces all destination registers by additional physical registers, the original register T is replaced by the additional physical register T' at block 76. But, the dependent micro-op 78 still cannot be executed before the first micro-op 77. Thus, no advantage is obtained by renaming the original destination register T of the original first micro-op 73. Renaming has made an additional physical register, e.g., T', unavailable for renaming other instructions, has wasted processor time in the doing look-ups, and has not facilitated out-of-order operation.

The present invention is directed to overcoming, or at least reducing the effects of, one or more of the problems set forth above.

SUMMARY OF THE INVENTION

In one aspect the present invention provides for a method for executing a sequence of instructions in a processor. The method comprises decoding the instructions into one or more first micro-ops, renaming destination registers identified in a first portion of the first micro-ops by reassigning available additional physical registers for the destination registers, and decoding a second portion of the first micro-ops into one or more second micro-ops. The act of renaming has renamed a destination register of at least one micro-op of the second portion of the first micro-ops. The method executes a third portion of the first and the second micro-ops.

BRIEF DESCRIPTION OF THE DRAWINGS

Other objects and advantages of the invention will become apparent upon reading the following detailed description and upon reference to the drawings in which:

FIG. 2A illustrates renaming of write-after-write instructions;

FIG. 2B illustrates renaming of write-after-read instructions;

Figure 1:
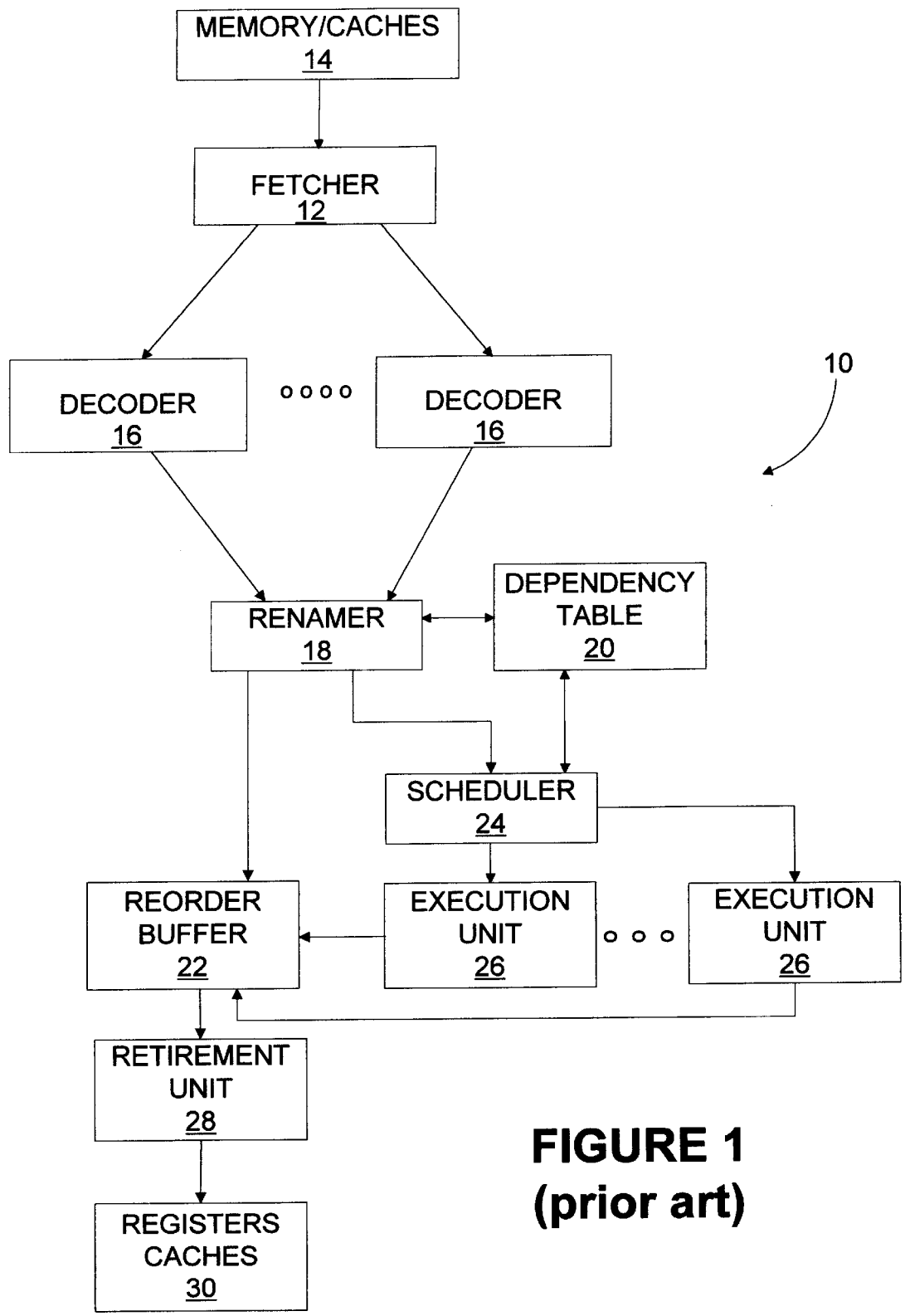
FIG. 1 is a high level block diagram of an out-of-order processor.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The macro instructions of complex-instruction-set computers (CISC) may have multiple destination and source addresses. Decoding produces micro-ops that are simpler and that satisfy uniformity restrictions on the number of source and destination addresses therein. For example, each micro-op of the below-described embodiments satisfy a uniformity restriction that states that micro-ops do not have more than one destination address and two source addresses. In other embodiments, the micro-ops satisfy other uniformity restrictions which limit the number of source and destination addresses.

In the specific embodiments, the decoding is performed in two stages. The first stage produces micro-ops, i.e. that satisfy the computer's uniformity restrictions. The first stage of decoding produces merged and unmerged micro-ops. The unmerged micro-ops satisfy the uniformity restrictions and are "executable" on the hardware execution units of the processor. The merged micro-ops satisfy the uniformity restrictions, but may "not be executable" on the execution units of the processor. The second stage of decoding expands the merged micro-ops further into micro-ops that may be executed by the execution units of the processor. The specific embodiments perform the second stage of decoding or expanding after renaming.

The merged micro-ops have special properties. The merged micro-ops are expandable into a chain of "executable" micro-ops having at least one register internal to the chain (see FIG. 3). Later micro-ops of the chain may be dependent upon the first micro-op of the chain. For example, a micro-op for a load to a destination register $R_{DEST}$, i.e. $R_{DEST}$=LOAD$\{S_1, S_2\}$, is a merged micro-op in one embodiment. $S_1$ and $S_2$ are source addresses. The LOAD$\{S_1, S_2\}$ instruction expands into three "executable" micro-ops that correspond to linear address generation, speculative load, and check load instructions.

T=GENERATE_ADDRESS $\{S_1, S_2\}$ $R_{DEST}$=SPECULATIVE_LOAD$\{T\}$ $R_{DEST}$=CHECK_LOAD $\{T\}$

The temporary register T only appears internally to the above chain of three micro-ops. The temporary register T is produced and consumed by the expansion of the merged micro-op. In other merged micro-ops, the expansion into "executable" micro-ops also employs at least one register, e.g., a temporary register, that only appears internal to the chain, i.e. one or more registers are produced and consumed by the expansion. In some specific embodiments, only a subset of the micro-ops that expand into chains of micro-ops in which one or more registers only appear internally are classified as merged micro-ops. In some embodiments, a portion of the merged micro-ops may expand into a single executable micro-op.

Figure 4:
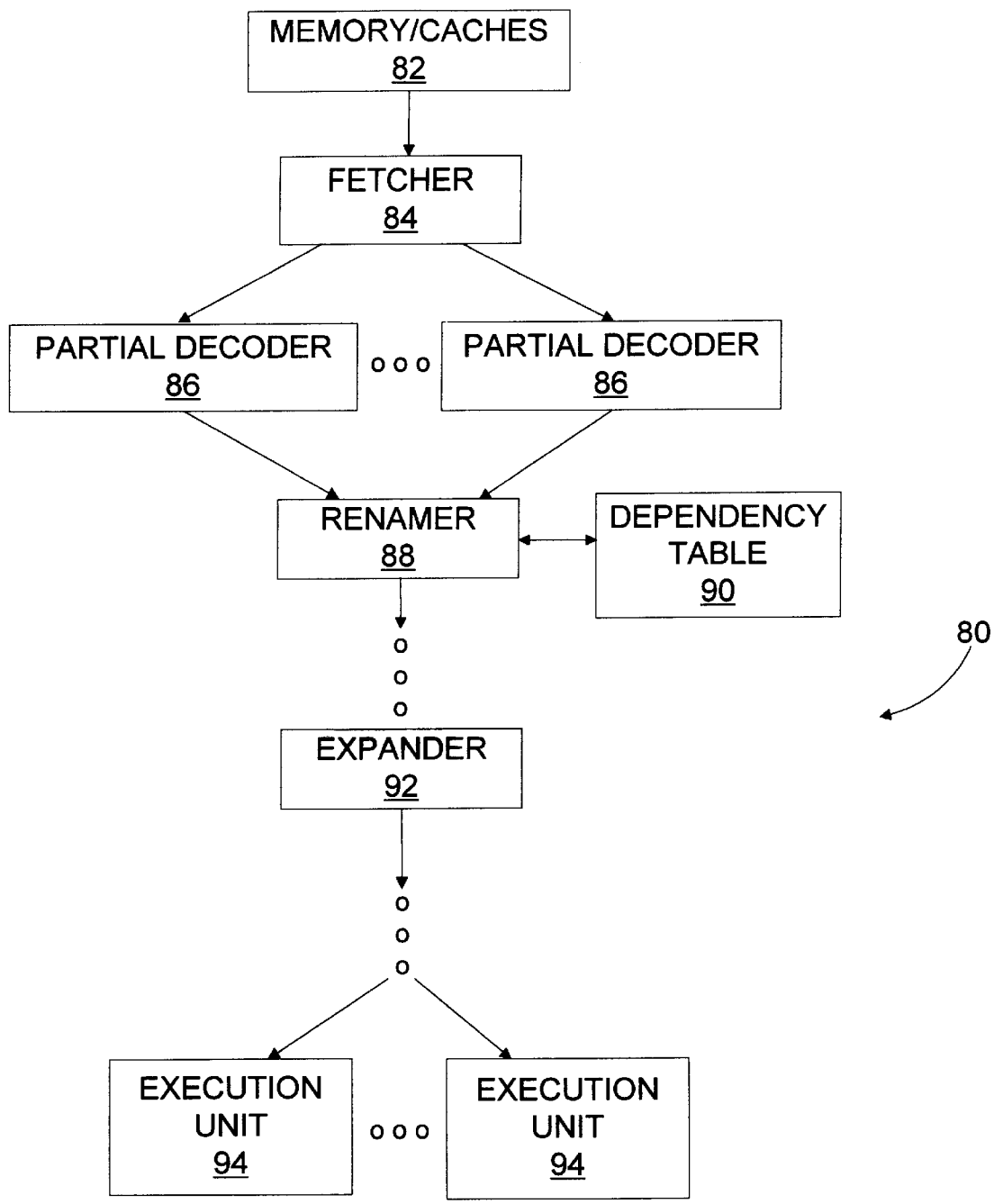
FIG. 4 is a high level block diagram illustrating a processor that expands merged micro-ops after renaming.

FIG. 4 illustrates a portion of a processor 80 that decodes merged micro-ops into executable micro-ops after renaming. Macro instructions are retrieved from memory and/or caches 82 by a fetcher 84. The fetcher 84 sends the macro instructions to one or more first decoders 86. The first decoders 86 have logic devices or structures that generate the merged and unmerged micro-ops from the original macro instructions. In light of the present disclosure, the construction of the logic devices for decoding macro instructions into merged and unmerged micro-ops is routine for an ordinary person in the art. In some embodiments, the partial decoders 86 may be omitted. The output instructions from the partial decoders 86, e.g. micro-ops and merged micro-ops, are sent to a renamer 88.

The renamer 88 assigns additional physical registers (not shown) of the processor 80 for temporary registers appearing as addresses in micro-ops. In some embodiments, the renamer 88 assigns one additional physical register for each temporary destination register as long as additional physical registers are available. In other embodiments, the renamer 88 only renames the temporary destination registers of certain classes of the micro-ops with new physical registers. For example, the renamer 88 of one embodiment only renames a temporary destination register with an additional physical register if an earlier unexecuted micro-op has the same register as a source or destination address. The renamer 88 performs look ups in a dependency table 90 to assign additional physical registers for source registers of dependent instructions consistently with previously renamed temporary destination registers. The dependency table 90 contains information on the assignments of additional physical registers and on dependencies among unexecuted instructions.

From the renamer 88, the micro-ops are sent to an expander 92 to perform the second decoding stage, i.e. the expansion of merged micro-ops into "executable" micro-ops. In some embodiments, other processor structures (not shown) may process and/or store instructions between the renamer 88 and expander 92 and between the expander 92 and the execution units 94. In some embodiments, the processor 80 has only one execution unit 94 while in other embodiments the processor 80 has several execution units 94.

Figure 5A:
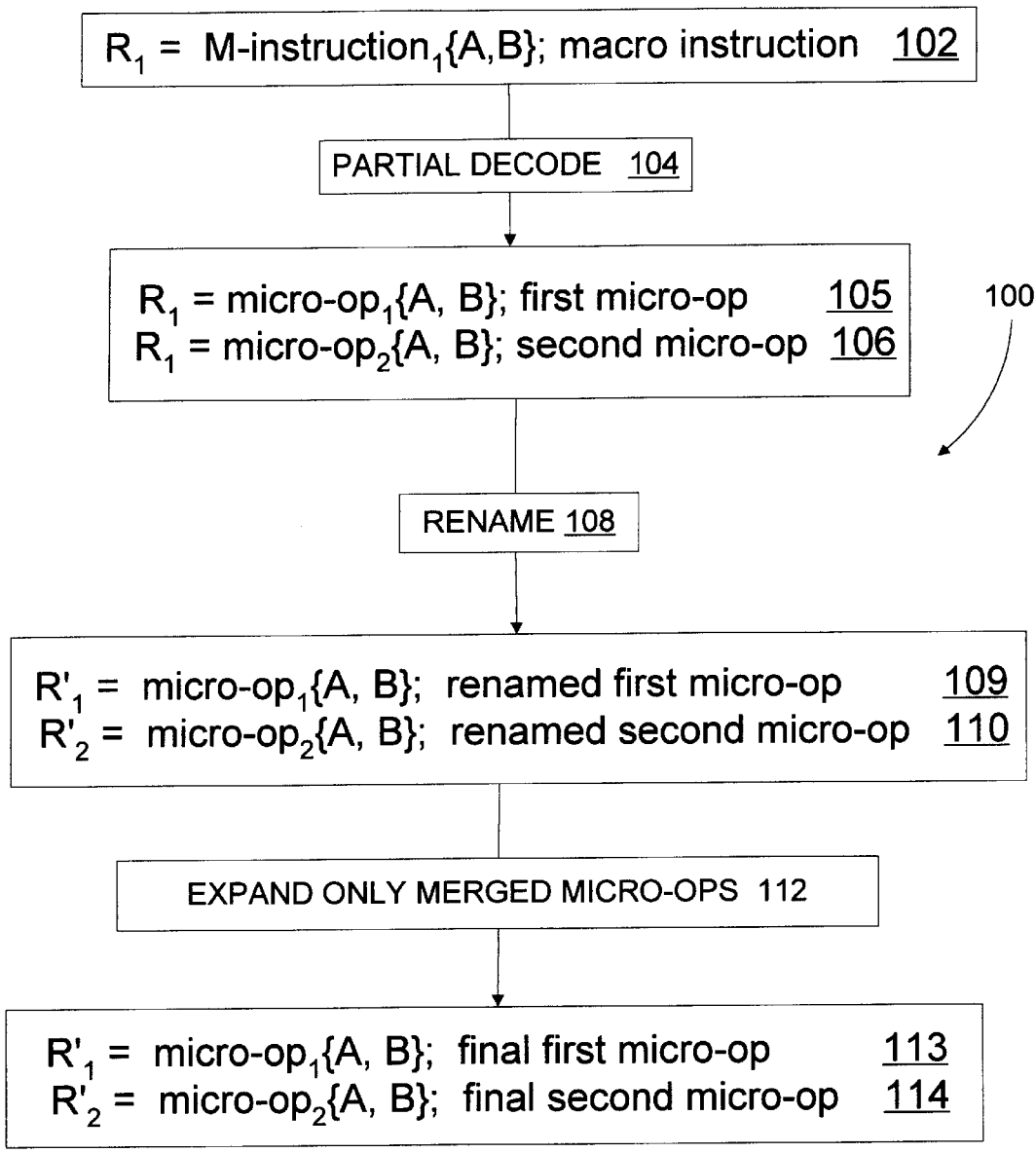
FIG. 5A is a flowchart illustrating the action of a specific embodiment for renaming and expanding on unmerged micro-ops.
Figure 5B:
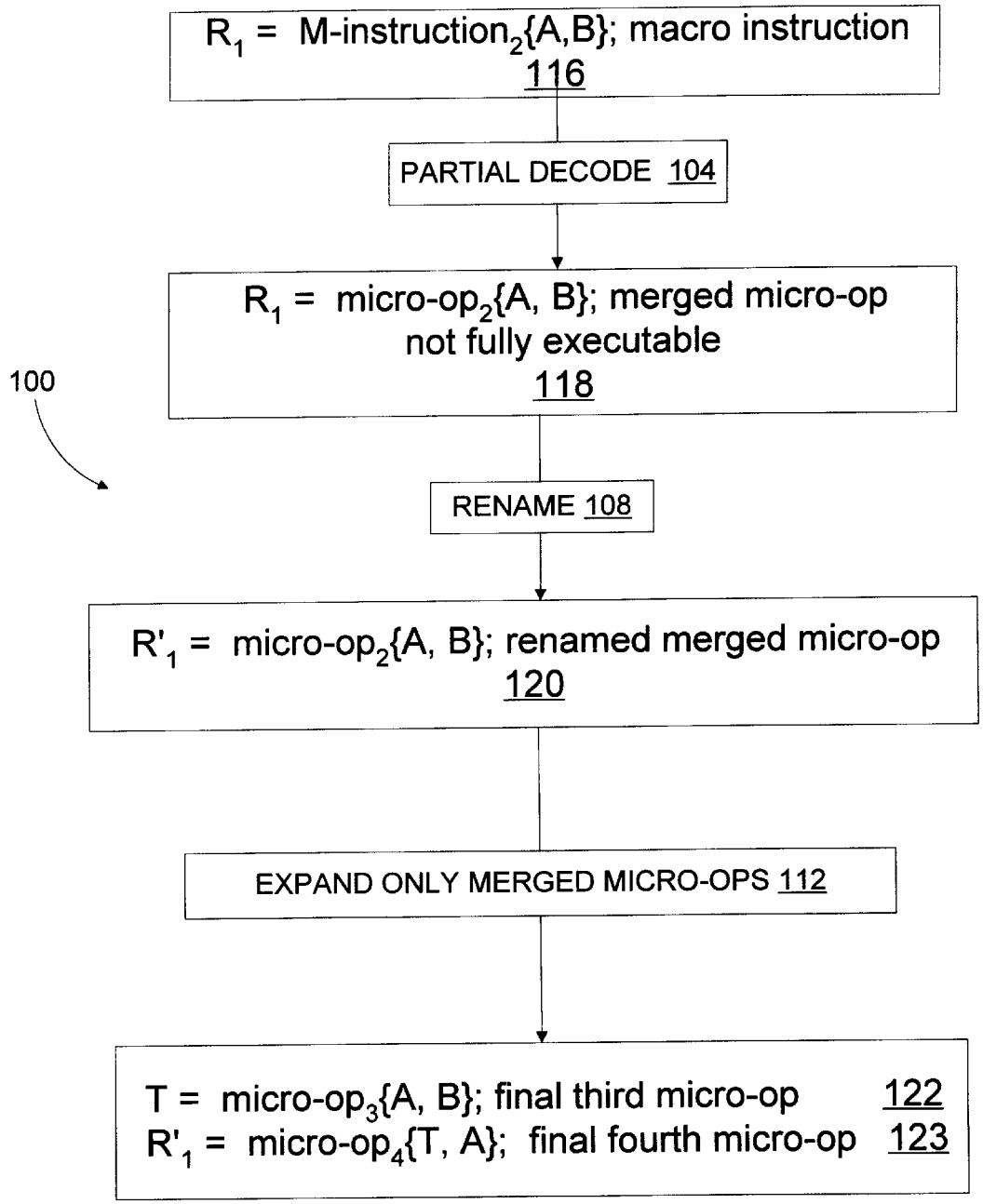
FIG. 5B is a flowchart illustrating the action of the specific embodiment of FIG. 4 on merged micro-ops.

The specific embodiments rename registers of an instruction before finishing the expansion into executable micro-ops when the instruction is an unmerged micro-op. FIGS. 5A and 5B are flowcharts illustrating the steps of a method 100 for decoding and renaming instructions that decode to merged and unmerged micro-ops. The method 100 involves decoding steps before renaming and after renaming.

FIG. 5A is a flowchart illustrating the effects of the steps of the method 100 on a macro instruction that decodes into unmerged micro-ops. First, the macro instruction is 102 decoded into executable first and second micro-ops 105, 106 at block 104. The micro-ops 105, 106 of this example are independent instructions, but the micro-ops resulting from decoding other macro instructions may contain dependencies.

At block 108, destination registers of the micro-ops, e.g. the two micro-ops 105, 106 are renamed with available additional physical registers. The two unrenamed micro-ops 105, 106 have the same destination register $R_1$. After renaming, the two micro-ops 109, 110 have different destination registers $R'_1$ and $R'_2$. The renaming step of block 108 also consistently renames source registers in later instructions that are dependent on the original unrenamed micro-ops 105, 106. The renaming of registers at block 108 ordinarily includes look-ups in the dependency table 90 to determine how temporary registers in an instruction's source addresses were previously renamed with additional physical registers. At block 112, remaining merged micro-ops are expanded into executable micro-ops. A macro instruction whose decoding does not contain merged micro-ops is not further decoded in the second decoding step of block 112.

Thus, the already executable micro-ops 109, 110 are equal to the final micro-op instructions 113, 114, respectively.

FIG. 5B is a flowchart illustrating the effects of the method 100 on a macro instruction which decodes into at least one merged micro-op. At block 104, the macro instruction 116 is decoded by the logic devices of the first decoders 86 of FIG. 4 into one or more micro-ops including, at least, one merged micro-op 118. With respect to the merged micro-op 118, the first decoding at block 104 is "partial", because the merged micro-op is unexecutable by the execution units 94 of FIG. 4. At block 108, the temporary destination register $R_1$ of the merged micro-op is renamed with an available additional physical register $R'_1$. At block 112, the renamed merged micro-op 120 undergoes a second decoding by the expander 92 of FIG. 4 into executable micro-ops 122, 123.

Figure 3:
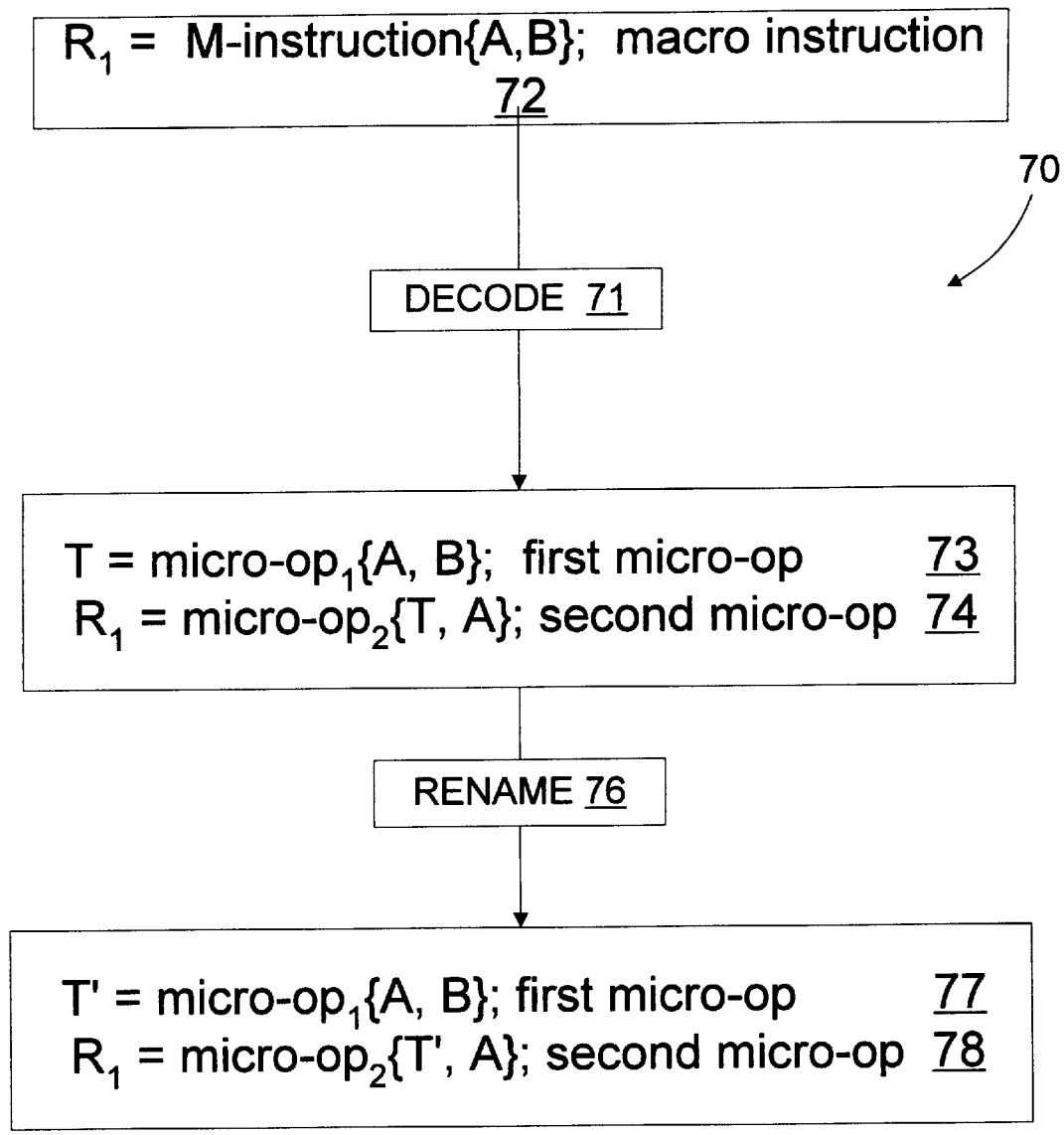
FIG. 3 is a flow chart illustrating a situation where renaming does not facilitate out-of-order execution.

The renamed micro-op 120 expands into a dependent chain of micro-ops containing one or more new internal temporary registers, i.e. the register T. The temporary register T is internal to the chain that results from the expansion. At block 108, by expanding the merged micro-op 120 after renaming, additional physical registers are not wasted on renaming internal temporary registers like T where renaming does not facilitate out-of-order execution. The macroinstruction 72 of FIG. 3 illustrates that the prior art processor 10 of FIG. 1 would have blindly renamed micro-ops coming from the merged micro-op 118. Fully decoding the macro instruction 116 to executable micro-ops before renaming would use up one more precious additional physical registers to obtain a chain of micro-ops analogous to the sequence 77, 78 of FIG. 3 which still cannot be executed out-of-order.

Figure 6:
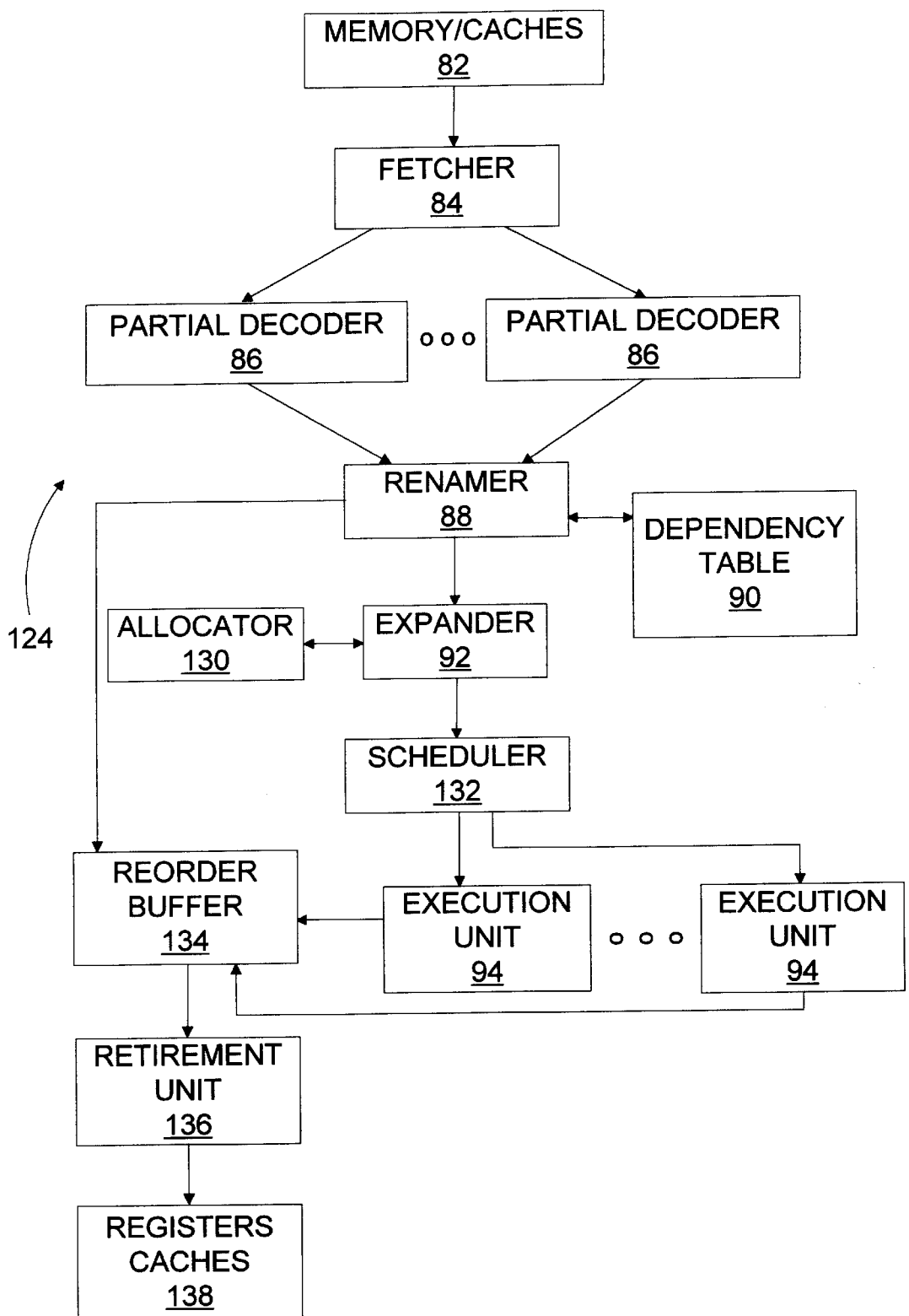
FIG. 6 is a high level block diagram illustrating a specific embodiment of a processor that expands merged micro-ops after renaming.

FIG. 6 illustrates a first specific embodiment for a processor 124 that renames merged micro-ops before full decoding. The renamer 88 renames both merged and unmerged micro-ops. After renaming, the renamer 88 assigns a location in the reorder buffer 134 to each micro-op and sends the micro-ops to the expander 92. The expander 92 performs the decoding of the merged micro-ops into a chain of executable micro-ops. The expander 92 is connected to an allocator 130. The allocator 130 performs a limited replacement of temporary registers internal to each chain with physical registers. In one embodiment, the allocator 130 replaces internal temporary registers with different physical registers only when the two assignments of physical registers to a temporary register can be simultaneously live. An assignment is live while an unretired instruction has the register as a destination address and also while the data stored in the register may be used by a consumer instruction having the temporary register as a source address. The limited replacement may also, for example, employ one physical register per internal register to remove artificial dependencies between different chains. The expander 92 sends the micro-ops to a scheduler 132. The scheduler 132 assigns execution positions to the micro-ops by a method that insures that dependent micro-ops are executed after the micro-ops on which they depend. The retirement unit 136 retires executed instructions from the reorder buffer 134 in the original instruction order and stores the results to registers or caches 138.

By performing the decoding of merged micro-ops after renaming, the embodiment 124 more efficiently assigns scarce additional physical registers to incoming instructions. The limited replacement step performed by the allocator 130 either assigns one additional physical register for the internal temporary register of a "chain" or assigns different physical registers if temporary registers can be simultaneously alive in different assignments. This reduces the number of physical registers employed by the combined steps of renaming and replacement.

There are several embodiments for the allocator 130. In a first embodiment, the allocator replaces the internal temporary register of each chain with a different physical register. If unassigned physical registers are not available, the allocator 130 stalls until more physical registers become available. In a second embodiment, the allocator 130 assigns the oldest assigned physical registers for the internal temporary registers when unassigned physical registers are not available. The second approach leads to artificial dependencies between the chains of micro-ops coming from separate merged micro-ops, but eliminates the risk of stall delays.

At the output terminal of the expander 92 of one embodiment, the machine code for each micro-op has a last-op-in-chain bit. The last-op-in-chain bit of the last micro-op of the chain from a merged micro-op has the value logic 1. For other micro-ops of the chain, the last-op-in-chain bit has the value logic 0. The last-op-in-chain bit is used to determine when to mark a merged micro-op as executed in the entry for the merged micro-op in the reorder buffer 134. After the micro-op, for which the last-op-in-chain bit has the value logic 1, is executed the entry in the reorder buffer 134 is updated to indicate that the merged micro-op has been executed. This insures that the merged micro-op is not ready for retirement by the retirement unit 136 before the last micro-op of the chain of micro-ops from the merged micro-op has been executed.

A merged micro-op occupies one entry in the reorder buffer 134 and several entries in the scheduler 132, because entries in the scheduler 132 are associated with executable micro-ops. The scheduler 132 insures that a particular micro-op is not executed before other micro-ops of the same chain on which the particular micro-op depends. In a first embodiment, the scheduler 132 assigns the micro-ops from each chain for in-order execution. In a second embodiment, the scheduler 132 contains a second dependency table (not shown) for the micro-ops internal to each chain to insure that internal dependent micro-ops are not executed before internal micro-ops on which they depend.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

What is claimed is:

1. A method comprising:

renaming at least one destination register for one or more micro-ops of a first set of one or more micro-ops;

decoding one or more micro-ops of the first set into a second set of one or more micro-ops, wherein the decoding comprises decoding at least one micro-op having a renamed destination register; and executing one or more micro-ops from the first set and/or one or more micro-ops from the second set.

2. The method of claim 1, wherein the first set comprises a first subset of one or more micro-ops and a second subset of one or more micro-ops;

wherein the decoding one or more micro-ops of the first set comprises decoding the first subset of one or more micro-ops into the second set of one or more micro-ops; and wherein the executing comprises executing the second subset of one or more micro-ops and the second set of one or more micro-ops.

3. The method of claim 1, comprising decoding one or more instructions into the first set of one or more micro-ops.

4. The method of claim 1, wherein the first set comprises a plurality of micro-ops in an order and wherein the executing comprises executing one or more micro-ops of the first set out-of-order.

5. The method of claim 1, wherein the renaming comprises renaming each destination register with a different available physical register.

6. The method of claim 1, wherein the renaming comprises updating a dependency table to rename any corresponding source registers for any dependent micro-ops of the first set.

7. The method of claim 1, comprising identifying an order for micro-ops of the first set in a reorder buffer and retiring each micro-op in the reorder buffer in order after the micro-op in the reorder buffer has been executed or after a corresponding one or more micro-ops of the second set have been executed.

8. The method of claim 1, wherein the decoding one or more micro-ops of the first set comprises decoding one or more micro-ops of the first set each into a chain of micro-ops.

9. The method of claim 8, wherein each chain of micro-ops has an order and wherein the executing comprises executing the micro-ops of each chain in order.

10. The method of claim 8, wherein the decoding one or more micro-ops of the first set each into a chain of micro-ops comprises designating a last micro-op in each chain.

11. The method of claim 8, comprising allocating a physical register for any temporary registers for each chain of micro-ops.

12. The method of claim 11, wherein the allocating comprises allocating a different available physical register for each temporary register or allocating a different available physical register for each temporary register that can be simultaneously live with another temporary register.

13. The method of claim 11, wherein the allocating comprises stalling allocation of a physical register for a temporary register or assigning an oldest assigned physical register for a temporary register when a physical register is not available.

14. An apparatus comprising:
a renamer to rename destination registers for a first set of instructions having a first subset of instructions and a second subset of instructions;
at least one expander to decode the first subset of instructions into a second set of instructions, wherein the at least one expander decodes an instruction of the first subset after any destination registers for that instruction have been renamed by the renamer; and
at least one execution unit to execute the second subset of instructions and the second set of instructions.

15. The apparatus of claim 14, comprising:
at least one decoder for decoding a third set of instructions into the first set of instructions.

16. The apparatus of claim 14, wherein the renamer renames each destination register with a different available physical register.

17. The apparatus of claim 14, comprising a dependency table, wherein the renamer updates the dependency table to rename any corresponding source registers for any dependent instructions of the first set.

18. The apparatus of claim 14, comprising a scheduler to schedule an order of execution for instructions of the first set.

19. The apparatus of claim 14, comprising:
a reorder buffer to identify an order for instructions of the first set; and
a retirement unit to retire each instruction in the reorder buffer in order after the instruction in the reorder buffer has been executed or after a corresponding one or more instructions of the second set have been executed.

20. The apparatus of claim 14, wherein the at least one expander decodes one or more instructions of the first subset each into a chain of instructions.

21. The apparatus of claim 20, comprising a scheduler to schedule an order of execution for instructions of each chain.

22. The apparatus of claim 20, wherein the at least one expander designates a last instruction in each chain.

23. The apparatus of claim 20, comprising an allocator to allocate a physical register for any temporary registers for each chain of instructions.

24. The apparatus of claim 23, wherein the allocator allocates a different available physical register for each temporary register or allocates a different available physical register for each temporary register that can be simultaneously live with another temporary register.

25. The apparatus of claim 23, wherein the allocator stalls allocation of a physical register for a temporary register or assigns an oldest assigned physical register for a temporary register when a physical register is not available.

26. A processor comprising:
at least one decoder for decoding a first set of instructions into a second set of instructions having a first subset of instructions and a second subset of instructions;
a renamer to rename destination registers for the second set of instructions;
at least one expander to decode the first subset of instructions into a third set of instructions, wherein the at least one expander decodes an instruction of the first subset after any destination registers for that instruction have been renamed by the renamer;
a scheduler for scheduling an order of execution for the second subset of instructions and the third set of instructions; and
at least one execution unit to execute the second subset of instructions and the third set of instructions.

27. The processor of claim 26, comprising:
a reorder buffer to identify an order for instructions of the second set; and
a retirement unit to retire each instruction in the reorder buffer in order after the instruction in the reorder buffer has been executed or after a corresponding one or more instructions of the third set have been executed.

28. The processor of claim 26, wherein the at least one expander decodes one or more instructions of the first subset each into a chain of instructions.

29. The processor of claim 28, comprising an allocator to allocate a physical register for any temporary registers for each chain of instructions.

30. An apparatus comprising:
means for decoding a first set of instructions into a second set of instructions having a first subset of instructions and a second subset of instructions;
means for renaming destination registers for the second set of instructions;
means for decoding the first subset of instructions into a third set of instructions such that each instruction of the first subset is decoded after any destination registers for that instruction have been renamed;

means for ordering execution of the second subset of instructions and the third set of instructions; and means for executing the second subset of instructions and the third set of instructions.

31. The apparatus of claim 30, wherein the means for decoding the first subset of instructions decodes one or more instructions of the first subset each into a chain of instructions.

32. The apparatus of claim 31, comprising means for allocating a physical register for any temporary registers for each chain of instructions.

33. The apparatus of claim 30, comprising:

means for identifying an order for instructions of the second set; and means for retiring each instruction of the second set in order after that instruction has been executed or after a corresponding one or more instructions of the third set have been executed.

34. An apparatus comprising:

means for renaming destination registers for a first set of instructions having a first subset of instructions and a second subset of instructions;

means for decoding the first subset of instructions into a second set of instructions such that each instruction of the first subset is decoded after any destination registers for that instruction have been renamed; and means for executing the second subset of instructions and the second set of instructions.

35. The apparatus of claim 34, wherein the means for decoding decodes one or more instructions of the first subset each into a chain of instructions.

36. The apparatus of claim 35, comprising means for allocating a physical register for any temporary registers for each chain of instructions.

\* \* \* \* \*